(12) United States Patent
Hoshina

(10) Patent No.: US 7,299,990 B2
(45) Date of Patent: Nov. 27, 2007

(54) RFID TAG, PRINTING PAPER, PRINTER, AND RFID SYSTEM

(75) Inventor: Masaki Hoshina, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/304,774

(22) Filed: Dec. 16, 2005

(65) Prior Publication Data

US 2006/0181716 A1    Aug. 17, 2006

(30) Foreign Application Priority Data

Jan. 28, 2005    (JP)    ............................ 2005-021136

(51) Int. Cl.
*G06F 17/00*    (2006.01)
*G06K 19/06*    (2006.01)
*G08B 13/14*    (2006.01)
*H04Q 5/22*    (2006.01)

(52) U.S. Cl. ................ 235/492; 340/572.1; 340/572.8; 340/10.51; 235/375

(58) Field of Classification Search ................ 235/492, 235/375, 472.02; 340/572.1, 0.8, 10.5–10.52; 358/1.15
See application file for complete search history.

(56) References Cited

U.S. PATENT DOCUMENTS

| | | | | |
|---|---|---|---|---|
| 6,019,865 A * | 2/2000 | Palmer et al. | ............... | 156/265 |
| 6,100,804 A * | 8/2000 | Brady et al. | ............. | 340/572.7 |
| 6,206,292 B1 * | 3/2001 | Robertz et al. | ............. | 235/488 |
| 6,222,452 B1 * | 4/2001 | Ahlstrom et al. | ......... | 340/572.1 |
| 6,275,156 B1 * | 8/2001 | Rasband | .................. | 340/572.1 |
| 6,369,711 B1 * | 4/2002 | Adams et al. | ........... | 340/572.1 |
| 6,381,418 B1 * | 4/2002 | Spurr et al. | .................. | 396/310 |
| 6,391,136 B1 * | 5/2002 | Stickelbrocks | .............. | 156/249 |
| 6,478,229 B1 * | 11/2002 | Epstein | ......................... | 235/492 |
| 6,547,151 B1 * | 4/2003 | Baldi | .......................... | 235/492 |
| 6,677,852 B1 * | 1/2004 | Landt | ......................... | 340/10.1 |
| 6,785,739 B1 * | 8/2004 | Tutt et al. | .................... | 709/245 |
| 6,827,279 B2 * | 12/2004 | Teraura | ....................... | 235/492 |
| 6,851,617 B2 * | 2/2005 | Saint et al. | .................. | 235/492 |
| 6,992,592 B2 * | 1/2006 | Gilfix et al. | ............ | 340/825.19 |
| 7,048,194 B2 * | 5/2006 | Minami et al. | .............. | 235/492 |
| 7,077,489 B2 * | 7/2006 | Waters | ........................... | 347/2 |
| 2002/0065680 A1 * | 5/2002 | Kojima et al. | ................. | 705/1 |
| 2002/0170973 A1 * | 11/2002 | Teraura | ...................... | 235/492 |
| 2002/0188259 A1 * | 12/2002 | Hickle et al. | ............... | 604/189 |
| 2002/0189750 A1 * | 12/2002 | Bleckmann et al. | ......... | 156/176 |
| 2002/0196126 A1 * | 12/2002 | Eisenberg et al. | .......... | 340/10.2 |
| 2003/0036425 A1 * | 2/2003 | Kaminkow et al. | ........... | 463/25 |
| 2003/0067381 A1 * | 4/2003 | Mitchell et al. | ........... | 340/5.92 |
| 2003/0197064 A1 * | 10/2003 | Saint et al. | .................. | 235/492 |
| 2003/0214388 A1 * | 11/2003 | Stuart et al. | ............... | 340/10.1 |
| 2004/0001000 A1 * | 1/2004 | Redlin | ...................... | 340/572.8 |
| 2004/0044956 A1 * | 3/2004 | Huang | ......................... | 715/511 |

(Continued)

FOREIGN PATENT DOCUMENTS

JP    A 2003-271911    9/2003

(Continued)

*Primary Examiner*—Daniel Walsh
(74) *Attorney, Agent, or Firm*—Oliff & Berridge, PLC

(57) ABSTRACT

A radio frequency identification tag to be attached to printing paper includes an upper face that is opposite to a face to be attached to the printing paper, the upper face being made of a paper material substantially equal to the printing paper.

6 Claims, 4 Drawing Sheets

U.S. PATENT DOCUMENTS

| | | | |
|---|---|---|---|
| 2004/0099742 A1* | 5/2004 | Minami et al. | 235/487 |
| 2004/0104241 A1* | 6/2004 | Broussard et al. | 221/289 |
| 2004/0125040 A1* | 7/2004 | Ferguson et al. | 343/895 |
| 2004/0134994 A1* | 7/2004 | Zaba et al. | 235/492 |
| 2004/0141790 A1* | 7/2004 | Waters | 400/611 |
| 2004/0156063 A1* | 8/2004 | Vraa et al. | 358/1.12 |
| 2004/0200061 A1* | 10/2004 | Coleman et al. | 29/825 |
| 2005/0001785 A1* | 1/2005 | Ferguson et al. | 343/895 |
| 2005/0024465 A1* | 2/2005 | Kobayashi et al. | 347/107 |
| 2005/0025553 A1* | 2/2005 | Hohberger et al. | 400/521 |
| 2005/0029353 A1* | 2/2005 | Isemura et al. | 235/454 |
| 2005/0035924 A1* | 2/2005 | Liu et al. | 343/895 |
| 2005/0058483 A1* | 3/2005 | Chapman et al. | 400/76 |
| 2005/0068180 A1* | 3/2005 | Miettinen et al. | 340/572.1 |
| 2005/0105140 A1* | 5/2005 | Ozaki | 358/402 |
| 2005/0116034 A1* | 6/2005 | Satake et al. | 235/432 |
| 2005/0134464 A1* | 6/2005 | Redin | 340/572.8 |
| 2005/0139667 A1* | 6/2005 | Barrus et al. | 235/432 |
| 2005/0171739 A1* | 8/2005 | Squibbs et al. | 702/187 |
| 2005/0173541 A1* | 8/2005 | Inoue et al. | 235/375 |
| 2005/0174240 A1* | 8/2005 | Vogt | 340/572.8 |
| 2005/0174241 A1* | 8/2005 | Olsen | 340/572.8 |
| 2005/0198208 A1* | 9/2005 | Nystrom | 709/219 |
| 2005/0218219 A1* | 10/2005 | Sano et al. | 235/383 |
| 2005/0230486 A1* | 10/2005 | Halope | 235/492 |
| 2005/0236469 A1* | 10/2005 | Chen | 235/375 |
| 2005/0252968 A1* | 11/2005 | Tsujimura et al. | 235/439 |
| 2005/0274791 A1* | 12/2005 | Ikeda et al. | 235/375 |
| 2005/0276647 A1* | 12/2005 | Chapman et al. | 400/62 |
| 2006/0000915 A1* | 1/2006 | Kodukula et al. | 235/492 |
| 2006/0030410 A1* | 2/2006 | Stenton et al. | 463/43 |
| 2006/0076399 A1* | 4/2006 | Imine et al. | 235/375 |
| 2006/0076422 A1* | 4/2006 | Coleman et al. | 235/492 |
| 2006/0092024 A1* | 5/2006 | Kim et al. | 340/572.1 |
| 2006/0109118 A1* | 5/2006 | Pelo et al. | 340/572.1 |
| 2006/0124723 A1* | 6/2006 | Satake et al. | 235/375 |
| 2006/0125636 A1* | 6/2006 | Nishida et al. | 340/572.1 |
| 2006/0125641 A1* | 6/2006 | Forster | 340/572.8 |
| 2006/0127154 A1* | 6/2006 | Barrus et al. | 400/76 |
| 2006/0131377 A1* | 6/2006 | Zimmerman | 235/375 |
| 2006/0173756 A1* | 8/2006 | Benight | 705/28 |
| 2006/0176181 A1* | 8/2006 | Halope | 340/572.8 |
| 2006/0180647 A1* | 8/2006 | Hansen | 235/375 |
| 2006/0181716 A1* | 8/2006 | Hoshina | 358/1.1 |
| 2006/0202010 A1* | 9/2006 | McDonnell | 235/375 |
| 2006/0220868 A1* | 10/2006 | Takasawa et al. | 340/572.1 |
| 2006/0226214 A1* | 10/2006 | Horn et al. | 235/375 |
| 2006/0238824 A1* | 10/2006 | Otake et al. | 358/448 |
| 2006/0250242 A1* | 11/2006 | Drapala et al. | 340/572.1 |
| 2006/0250250 A1* | 11/2006 | Youn | 340/572.7 |
| 2006/0261938 A1* | 11/2006 | Lai et al. | 340/505 |
| 2006/0266832 A1* | 11/2006 | Howarth et al. | 235/451 |
| 2006/0290513 A1* | 12/2006 | Shanton | 340/572.7 |
| 2007/0013520 A1* | 1/2007 | Conwell et al. | 340/572.1 |
| 2007/0014615 A1* | 1/2007 | Kasayama et al. | 400/76 |
| 2007/0030151 A1* | 2/2007 | Morrow | 340/572.1 |
| 2007/0056683 A1* | 3/2007 | Manes et al. | 156/264 |
| 2007/0085685 A1* | 4/2007 | Phaneuf et al. | 340/572.8 |
| 2007/0095922 A1* | 5/2007 | Kawai | 235/492 |
| 2007/0145150 A1* | 6/2007 | Barczyk et al. | 235/492 |

FOREIGN PATENT DOCUMENTS

JP        A 2004-202894        7/2004

* cited by examiner

RFID TAG, PRINTING PAPER, PRINTER, AND RFID SYSTEM

BACKGROUND

1. Technical Field

The present invention relates to radio frequency identification (RFID) tags, printing paper, printers, and RFID systems.

2. Related Art

RFID data carriers that include a coil antenna pattern arranged on a substrate made of plastic or the like and that form a resonance circuit by the antenna pattern and a capacitance element so as to receive and transmit radio waves at a constant frequency have been available. Some of such RFID data carriers (RFID tags) are provided with a memory. Depending on the capacity of the memory, an RFID data tag is capable of storing only a unique ID number or capable of storing other information as well as a unique ID number.

In order to make handling of RFID tags in which invisible information is stored easier, label paper including RFID is proposed, for example, in Japanese Unexamined Patent Application Publication No. 2004-202894, on which information or the like stored in an RFID tag can be printed. In addition, a technology for providing a liquid crystal display or a microcapsule electrophoretic display that displays information stored in an RFID tag is proposed, for example, in Japanese Unexamined Patent Application Publication No. 2003-271911.

In the above-mentioned technologies, information stored in an RFID tag is simply printed or displayed as character information. In addition, a dedicated printer is needed for printing such information on label paper including an RFID tag.

SUMMARY

An advantage of the invention is that it provides a printer and the like capable of printing an image, a character, or the like on paper including an RFID tag and capable of storing information on the printed image or character or related information in the RFID tag.

In order to solve the above problems, according to an aspect of the invention, an RFID tag to be attached to printing paper includes an upper face that is opposite to a face to be attached to the printing paper, the upper face being made of a paper material substantially equal to the printing paper.

Accordingly, printing (drawing) can be performed on an RFID tag. Thus, even if an RFID tag is attached to printing paper, a printing area is not reduced.

In addition, when the RFID tag to be attached to printing paper has a total length substantially equal to a width of the printing paper, the maximum antenna adjusted to printing paper can be acquired. Thus, a communication area can be increased.

In addition, when the RFID tag to be attached to printing paper includes an upper face that is opposite to a face to be attached to the printing paper, the upper face being made of a paper material substantially equal to the printing paper, and has a total length substantially equal to a width of the printing paper, even if the RFID tag is attached to the printing paper, a printing area is not reduced, and at the same time, a communication area can be increased.

According to an aspect of the invention, printing paper includes the foregoing radio frequency identification tag.

Accordingly, a character or an image can be satisfactorily drawn, and information related to the character or the image can be satisfactorily stored (written).

According to an aspect of the invention, a printer for drawing a character or an image on printing paper including a radio frequency identification tag includes a drawing unit that draws the character or the image on the printing paper, and a communication unit that writes information related to the character or the image into the radio frequency identification tag.

Accordingly, drawing of a character or an image on printing paper and writing of the character or the image into an RFID tag can be performed at substantially the same time. Thus, a discrepancy between a drawn object and stored information in an RFID tag can be prevented easily and reliably.

In addition, when the above-described printing paper is used as the printing paper, even if an RFID is attached later, drawing of a character or an image and writing of the character or the image into the RFID tag can be performed satisfactorily.

According to an aspect of the invention, a radio frequency identification system stores information related to an image or a character drawn on printing paper including a radio frequency identification tag in the radio frequency identification tag, reads the stored information by using an external communication unit, and displays or outputs the stored information by using an external apparatus connected to the external communication unit.

Accordingly, since information related to a character or an image printed (drawn) on printing paper is displayed or output, information that cannot be represented by printing can be added. Thus, this technology can be used in a wider field, such as business advertising.

In addition, when the stored information is character information, sound information, static image information, or moving image information, for example, a photograph with syllabic sound can be provided. In addition, a printed image can be used as an index.

In addition, when the external apparatus is a portable information terminal, use of a cellular phone or a portable game terminal allows many people to acquire information and enables representation using an image, sound, and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

An RFID tag, printing paper, a printer, and an RFID system according to an embodiment of the invention will be described with reference to the drawings.

Figure 1:
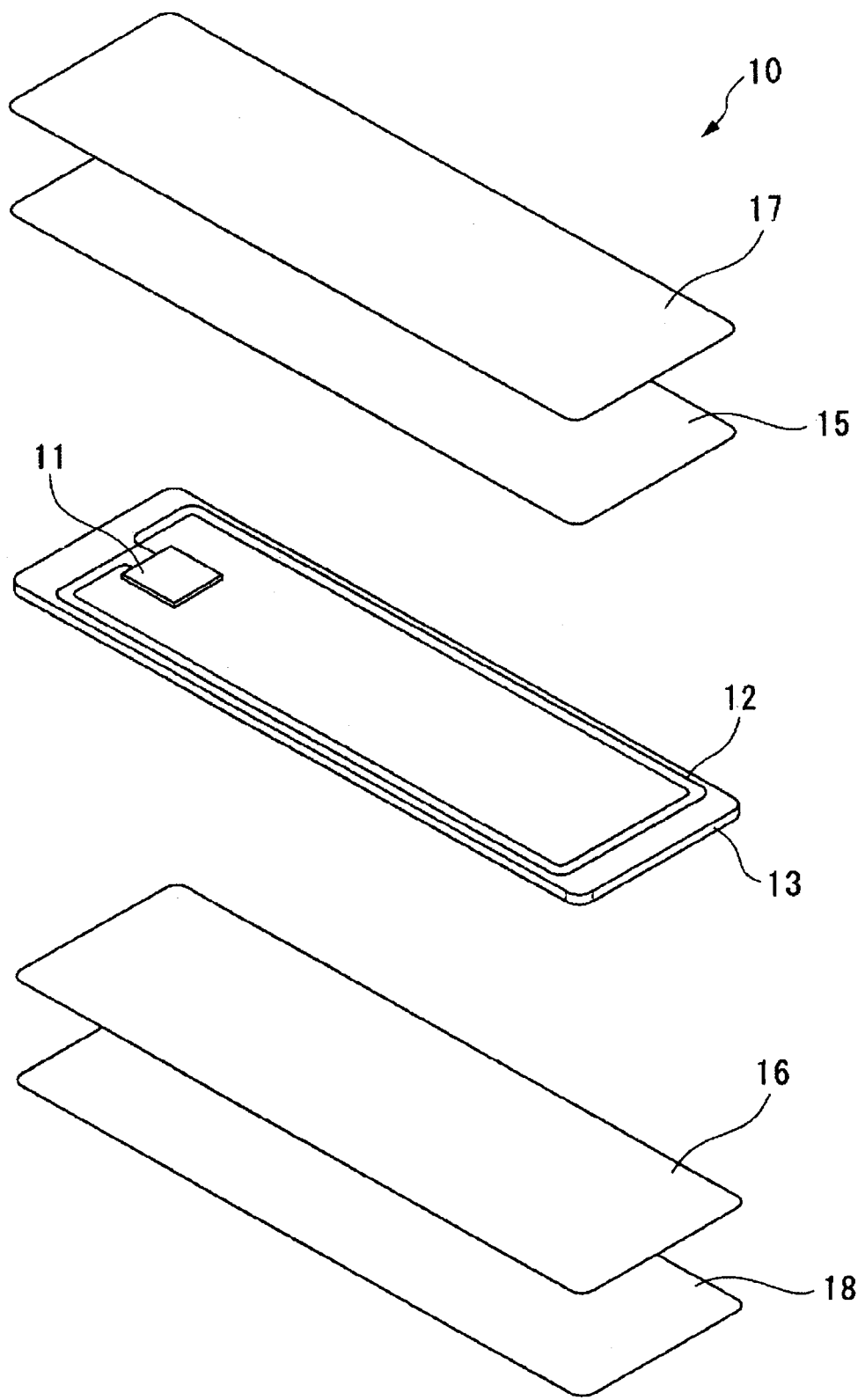
FIG. 1 is an exploded perspective view of an RFID tag.

FIG. 1 is an exploded perspective view of an RFID tag 10. The RFID tag 10 includes an inlet 13 covered with protection films 15 and 16. The inlet 13 is provided with an integrated circuit (IC) chip 11 and an antenna 12.

The inlet 13 is a flexible printed-circuit board (FPC) formed by sandwiching a wiring electrode between cover films. The IC chip 11, the antenna 12, and various wires are arranged on the upper face of the inlet 13.

The IC chip 11 includes a central processing unit (CPU) performing various operations, a read-only memory (ROM), a random-access memory (RAM), a memory, a transmission and reception unit, and the like. In accordance with an instruction from the CPU, the IC chip 11 receives information from outside via the transmission and reception unit, stores the received information in the memory, and transmits information stored in the memory to the outside.

The antenna 12 is arranged in a coil shape along the periphery on the inlet 13 arranged in a rectangular shape. Liquid metal droplets may be sprayed by inkjet printing to form the antenna 12 and to connect the antenna 12 and the IC chip 11.

Although the protection films 15 and 16 are provided for protecting the IC chip 11 and the antenna 12 from ultraviolet rays and external force, the protection films 15 and 16 may be omitted.

In addition, a paper sheet 17 is attached to the protection film 15. The paper sheet 17 is made of a material substantially equal to that of printing paper, which will be described below. In contrast, an adhesive sheet 18 is attached to the protection film 16. The adhesive sheet 18 is used for attaching the RFID tag 10 to the printing paper. In other words, when the RFID tag 10 is attached to the printing paper via the adhesive sheet 18, the paper sheet 17 made of a material substantially equal to that of the printing paper is exposed to the surface. Thus, even if the RFID tag 10 is attached to the printing paper, the RFID tag 10 does not stand out. In addition, printing can be performed on the RFID tag 10.

Figure 2:
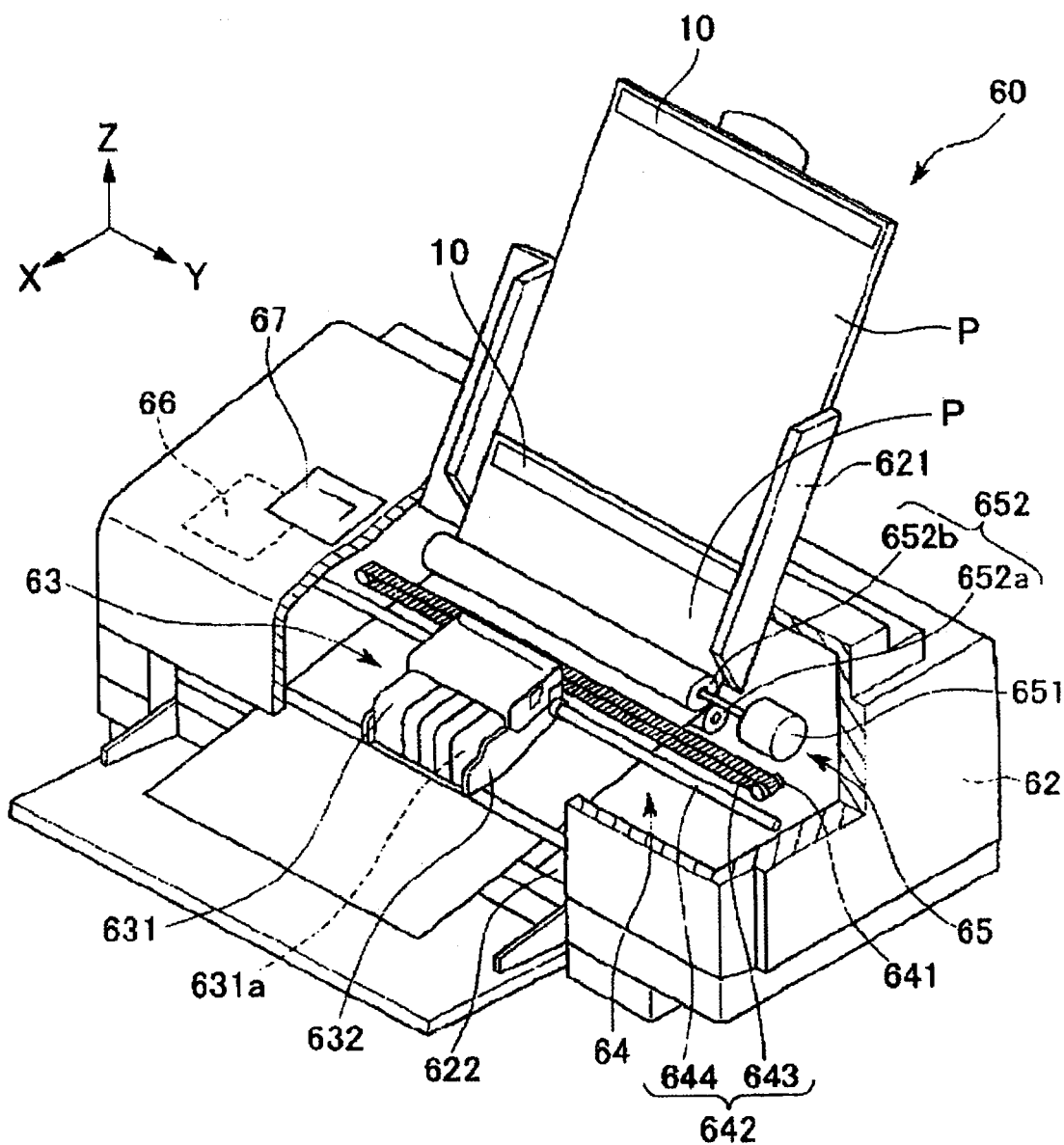
FIG. 2 is a schematic diagram showing an inkjet printer.

The RFID tag 10 has a strip-like rectangular shape. The length of the RFID tag 10 is substantially equal to or slightly shorter than the width of printing paper to which the RFID tag 10 is attached. For example, the RFID tag 10 to be attached to A4 printer paper (210 mm×297 mm) has a length of 210 mm, and is attached to an edge of the printing paper, as shown in FIG. 2.

The RFID tag 10 need not be attached to an edge of printing paper. In addition, the width of the RFID tag 10 is, for example, between about 5 mm and about 10 mm.

In addition, the size of paper to which the RFID tag 10 is attached need not necessarily be A4 paper. The RFID tag 10 may have various lengths so as to be attached to paper of standardized sizes, such as an A5 size, a B5 size, a postcard size, an envelope size, a photograph size (including an L size and a double-L size), a business card size, and a CD jacket size.

In addition, printing paper may be, for example, a newspaper, a magazine, or a poster. If the size of paper is defined by a standard, the RFID tag 10 suitable for the paper can be formed and attached.

As described above, a plurality of lengths can be set as the length of the RFID tag 10. The number of turns and the shape of the antenna 12 are optimized in accordance with the length of the RFID tag 10. This is because since the communication distance changes depending on the size of the antenna 12, necessary communication quality cannot be ensured.

As described above, the RFID tag 10 has a strip-like rectangular shape, and the length of the RFID tag 10 is set to be substantially equal to the width of printing paper to which the RFID tag 10 is attached. This is because the communication distance is increased as much as possible and the size of the RFID tag 10 is reduced so as to be inconspicuous as much as possible when the RFID tag 10 is attached to printing paper. Thus, although the RFID tag 10 having a length substantially equal to the length in the long side direction of paper may be attached, trouble is likely to occur in paper feeding in an inkjet printer 60, which will be described below.

The RFID tag 10 is not necessarily attached to a printed side of printing paper P. The RFID tag 10 may be attached to a rear side. In addition, the RFID tag 10 is not necessarily attached to the printing paper P. The RFID tag 10 may be inserted (woven) inside the printing paper P in advance. In this case, the paper sheet 17 and the adhesive sheet 18 are not necessarily used.

In addition, a plurality of RFID tags 10 may be attached to a sheet of paper.

A printer for printing (drawing) a desired character, image, or the like on the printing paper P to which the RFID tag 10 is attached is described next.

FIG. 2 is a schematic diagram showing the inkjet printer 60 according to this embodiment. In the following description, an upper side in a Z direction is referred to as an "upper portion" and a lower side in the Z direction is referred to as a "lower portion".

The inkjet printer 60 includes a tray 621 provided at the upper back of a printer main unit 62, an outlet slot 622 provided at the lower front of the printer main unit 62, and an operation panel 67 provided on the upper face of the printer main unit 62. The printing paper P is set in the tray 621, and the printing paper P is ejected from the outlet slot 622.

The operation panel 67 is a display device, such as a liquid crystal display, an organic electroluminescent display, or a light-emitting diode (LED) lamp display. The operation panel 67 includes a display unit (not shown) for displaying an error message or the like and an operation unit (not shown) including various switches.

The printer main unit 62 contains therein a printing device 64 including a head unit 63 mainly performing reciprocating motion, a paper feeder 65 for feeding sheets of printing paper P one by one to the printing device 64, a controller 66 for controlling the printing device 64 and the paper feeder 65, and the like.

In accordance with an instruction from the controller 66, the paper feeder 65 intermittently feeds sheets of printing paper P one by one. The intermittently fed printing paper P passes near the lower portion of the head unit 63. Here, the head unit 63 performs reciprocating motion in a direction substantially orthogonal to the fed direction of the printing paper P, and printing on the printing paper P can be performed. In other words, reciprocating motion of the head unit 63 and intermittent feeding of the printing paper P are main scanning and sub scanning in printing. Accordingly, inkjet printing is performed.

The printing device 64 includes the head unit 63, a carriage motor 641 functioning as a driving source of the head unit 63, and a reciprocating mechanism 642 causing the head unit 63 to reciprocate in response to rotation of the carriage motor 641.

The head unit 63 includes an inkjet head provided with many nozzles, an ink cartridge 631 for supplying ink to the inkjet head, and a carriage 632 on which the inkjet head and the ink cartridge 631 are mounted. The inkjet head, the ink cartridge 631, and the carriage 632 are provided at a lower portion of the head unit 63.

When the ink cartridge 631 is filled with ink of four colors, yellow, cyan, magenta, and black, full-color printing can be performed. In this case, inkjet heads for the respective colors are provided in the head unit 63. However, the color of ink is not necessarily yellow, cyan, magenta, or black.

The reciprocating mechanism 642 includes a carriage guide shaft 644 whose both ends are supported by a frame (not shown) and a timing belt 643 extending in parallel to the carriage guide shaft 644 and performing a traveling operation. The carriage 632 is reciprocatably supported by the carriage guide shaft 644 and is fixed by part of the timing belt 643. When an operation of the carriage motor 641 causes the timing belt 643 to travel forward and backward via a pulley, the head unit 63 reciprocates, guided by the carriage guide shaft 644.

In the reciprocation operation, ink is ejected from the inkjet head in an appropriate fashion. Accordingly, printing (drawing) on the printing paper P is performed.

The paper feeder 65 includes a paper feed motor 651 functioning as a driving source of the paper feeder 65 and a paper feed roller 652 rotating around the shaft in accordance with the operation of the paper feed motor 651. The paper feed roller 652 includes a slave roller 652a and a driving roller 652b that face each other in the vertical direction across a feed path for the printing paper P. The driving roller 652b is connected to the paper feed motor 651. With this configuration, the paper feed roller 652 is capable of feeding to the printing device 64 many sheets of paper set in the tray 621 one by one.

Instead of the tray 621, a paper feed cassette accommodating the printing paper P may be detachably installed.

The controller 66 controls a printing operation by driving the printing device 64, the paper feeder 65, and the like in accordance with print data input from a host computer, such as a personal computer or a digital camera. Although not illustrated, the controller 66 includes a memory mainly storing a control program and the like for controlling each unit, a head driving circuit for driving the inkjet head to control timing for ejecting ink, a control circuit for driving the printing device 64 (that is, the carriage motor 641), a driving circuit for driving the paper feeder 65 (that is, the paper feed motor 651), a communication circuit receiving print data from the host computer, and a CPU electrically connected to the above-mentioned units in the controller 66 and performing various control in the units.

Various sensors that can detect printing environment, such as the remaining ink level of the ink cartridge 631, the position of the head unit 63, the temperature, and the humidity, are electrically connected to the CPU. The controller 66 receives print data via the communication circuit and stores the received print data in the memory. The CPU processes the print data, and outputs a driving signal to each driving circuit in accordance with the processed data and input data received from each sensor. The driving signal causes the inkjet head, the printing device 64, and the paper feeder 65 to operate. Accordingly, desired printing (drawing) can be performed on the printing paper P.

Figure 3:
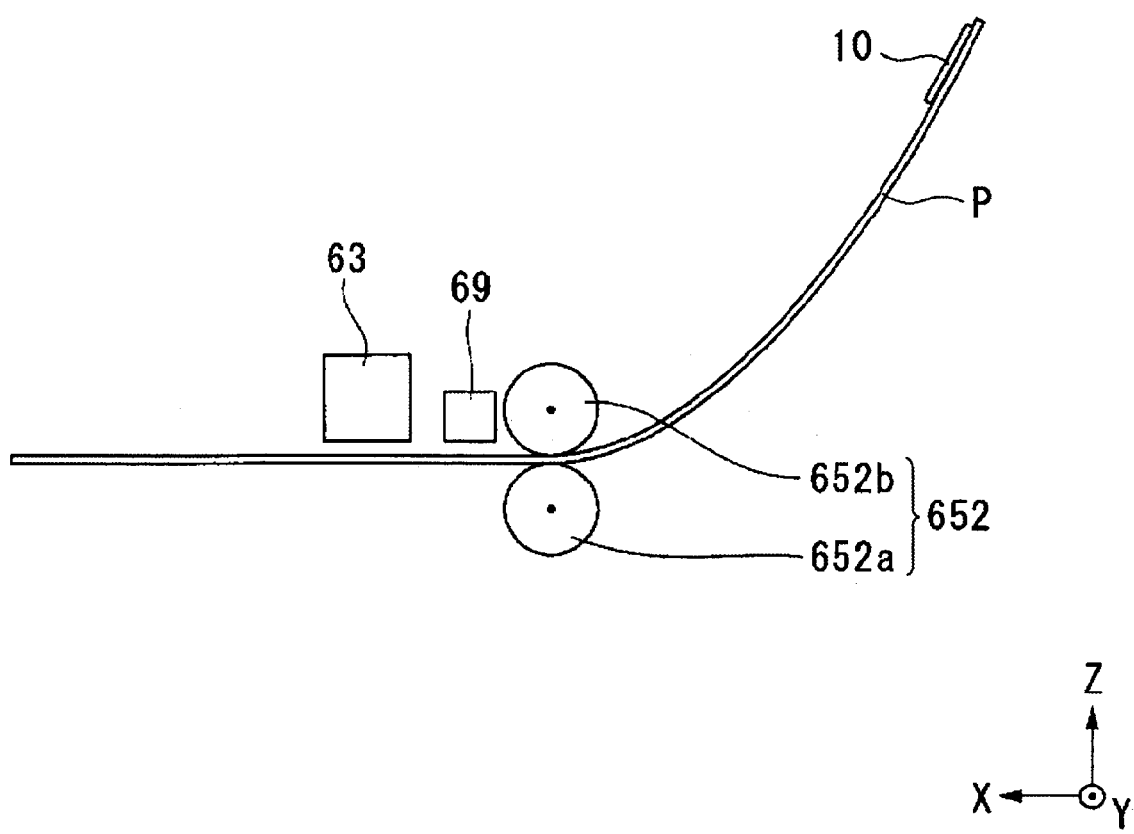
FIG. 3 is a cross-sectional view showing the inkjet printer.

FIG. 3 is a cross-sectional view of the inkjet printer 60 according to this embodiment.

The inkjet printer 60 also includes a communication unit 69. The communication unit 69 transmits predetermined information to the RFID tag 10 in accordance with an instruction from the controller 66. The communication unit 69 is arranged in the immediately previous position of the head unit 63, as shown in FIG. 3.

Since the communication unit 69 is provided in the inkjet printer 60, a desired character or image can be printed (drawn) on the printing paper P, and at the same time, predetermined information can be transmitted to the RFID tag 10 by communicating with the RFID tag 10 attached to the printing paper P. The communication unit 69 may be arranged in any position as long as the communication unit 69 can communicate with the RFID tag 10 attached to the printing paper P.

Information, such as an ID number of the RFID tag 10, is transmitted from the RFID tag 10 to the communication unit 69. In contrast, information related to a character or an image printed (drawn) on the printing paper P, such as character information including an ID number and photographed (produced) date and time of image information, is transmitted from the communication unit 69 to the RFID tag 10. In addition, sound information related to the image information and other types of image information (irrespective of static images or moving images) related to the image information may be transmitted from the communication unit 69 to the RFID tag 10. Character information or image information equal to a character or an image printed (drawn) on the printing paper P may be transmitted from the communication unit 69 to the RFID tag 10. The information transmitted to the RFID tag 10 is stored in a readable/writable random access nonvolatile memory of the RFID tag 10. The nonvolatile memory is, for example, a flash memory or a ferroelectric RAM (FeRAM).

As described above, the inkjet printer 60 is capable of printing (drawing) a desired character or image on the printing paper P and capable of storing predetermined information in the RFID tag 10 attached to the printing paper P (writing the predetermined information to the nonvolatile memory).

Thus, an image photographed by a digital camera or a digital video camera is printed on the printing paper P, and at the same time, character information, such as the photographed date of the image, sound information when being photographed, other images photographed at substantially the same time, a moving image including the printed image, and the like are stored in the RFID tag 10. In other words, information that cannot be represented only by printing can be stored and kept by being attached to a printed image.

In addition, since the upper face of the RFID tag 10 is formed by a paper sheet made of paper substantially equal to the printing paper P, a desired character or image can be printed (drawn) on the RFID tag 10. Thus, a character or image can be printed on the RFID tag 10 similarly to normal paper without reducing a printing area.

An RFID system using the printing paper P including the RFID tag 10 is described next.

As described above, a desired character or image is printed (drawn) on the printing paper P including the RFID tag 10 by the inkjet printer 60. Various types of information related to the character or the image are stored in the attached RFID tag 10. Thus, the various types of information stored in the RFID tag 10 can be read using an external apparatus (reader) that can be communicated with the RFID tag 10. In other words, when the external apparatus is close to the printing paper P on which the image or the like is printed, communication is performed between the external apparatus and the RFID tag 10. Accordingly, the information stored in the RFID tag 10 can be acquired.

As described above, the information stored in the RFID tag 10 may include sound information and image information as well as character information. Thus, when a speaker and a display are connected to the external apparatus, such information can be reproduced. In other words, not only character information but sound and images can also be output and displayed.

Figure 4:
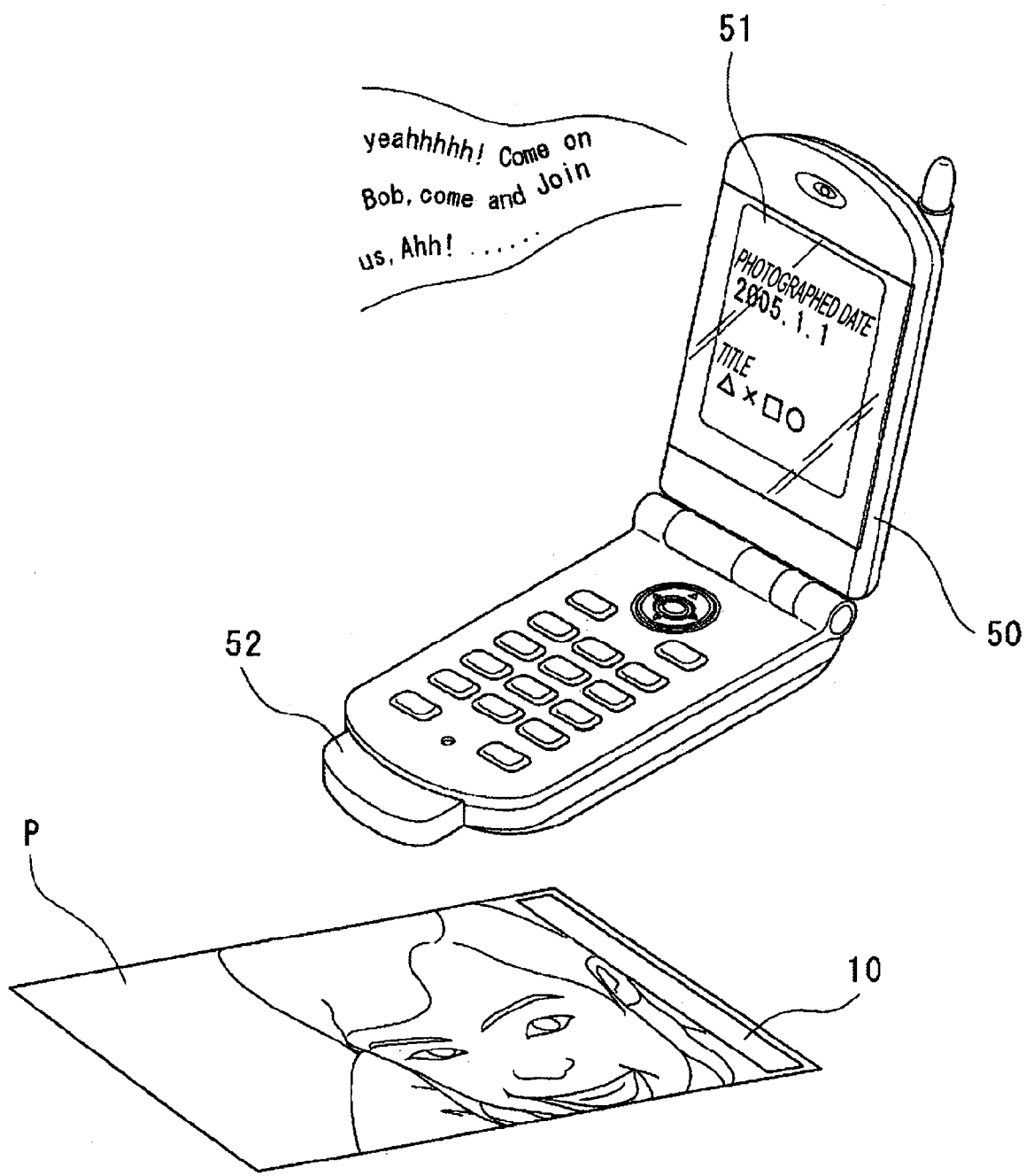
FIG. 4 schematically shows an RFID system.

More specifically, as shown in FIG. 4, in a case where an image photographed by a digital camera, which is not shown, is printed (drawn) on the printing paper P, when an external apparatus 50 is close to the printing paper P, sound related to the printed image or the like, a moving image including the printed image, or character information is output or displayed from a speaker (not shown) or a display 51 connected to the external apparatus 50. Accordingly, much more information as well as a printed image can be reproduced.

Although the external apparatus 50 may be a stationary reader or the like, a portable information terminal, such as a notebook computer, a cellular phone, or a portable game terminal, is suitably used as the external apparatus 50, as shown in FIG. 4. Such a portable information terminal is capable of displaying images and capable of playing back sound. In other words, a reader 52 is installed on a notebook computer, a cellular phone, or a portable game terminal. Accordingly, various types of information can be readily acquired from the printing paper P including the RFID tag 10. In addition, the reader 52 may be incorporated within such a portable apparatus.

Although a case where the printing paper P including the RFID tag 10, on which a desired character or image is printed by the inkjet printer 60, is used has been described in the foregoing embodiment, the invention is not limited to this. In other words, printing on the printing paper P may be performed by another printer or the like.

For example, in a case where the RFID tag 10 is attached to a so-called direct mail letter, when a cellular phone provided with a reader is close to the direct mail letter, a predetermined advertising image is displayed on a display of the cellular phone or advertising sound is output.

In addition, when uniform resource locator (URL) information is stored in the RFID tag 10 using an Internet connection function of a cellular phone and the stored URL information is read by the cellular phone, the cellular phone accesses the homepage of an advertiser by connecting to the Internet. Then, advertising image or sound can be displayed or output.

In addition, the RFID tag 10 may be attached to a business card, so that a facial picture, URL information, a telephone number, a facsimile number, company information, and the like can be stored.

In addition, in a case where the RFID tag 10 is attached to a newspaper advertisement, a poster, or the like, when an unspecified number of portable information terminals each provided with a reader are close to the RFID tag 10, an advertisement or route guidance to a shop can be displayed on the portable information terminals.

As described above, according to the RFID system, since information stored in the RFID tag 10 is read and reproduced by a portable information terminal or the like, an unspecified number of users are able to acquire various types information via the printing paper P including the RFID tag 10. In particular, in a case where information that cannot be represented by a printed character or static image is stored, when such information is read and displayed by portable information terminals owned by an unspecified number of users, the information can be provided to many users.

Operation procedures, shapes of component members, and combinations of the component members described in the foregoing embodiment are merely examples. Various changes and modifications can be made to the invention without departing from the spirit and the scope thereof.

For example, a display unit may be provided in the RFID tag 10. It is desirable that the display unit be an electrophoretic display device. In addition, it is desirable that character information stored in the RFID tag 10 be displayed on the display unit.

The entire disclosure of Japanese Patent Application No. 2005-021136, filed Jan. 28, 2005 is expressly incorporated by reference herein.

What is claimed is:

1. A radio frequency identification system comprising: a printing paper including a radio frequency identification tag, the radio frequency identification tag including: a first sheet, the first sheet being made of a paper material substantially equal to the printing paper, a second sheet to be attached to the printing paper, the second sheet being made of an adhesive material, a first protection film disposed between the first sheet and an inlet, a second protection film disposed between the second sheet and the inlet, and an integrated circuit chip and an antenna disposed between the first sheet and the second sheet; an inkjet printer including: an inkjet drawing unit that draws a character or an image on the printing paper, and a communication unit that stores information related to the character or the image in the radio frequency identification tag at the same time that the inkjet drawing unit draws the character or image on the printing paper; a reader that reads the information stored in the radio frequency identification tag; and an external apparatus connected to the reader that displays or outputs the information.

2. The radio frequency identification system according to claim 1, wherein the stored information is character information.

3. The radio frequency identification system according to claim 1, wherein the external apparatus is a portable information terminal.

4. The radio frequency identification system according to claim 1, wherein the stored information is static image information.

5. The radio frequency identification system according to claim 1, wherein the stored information is video.

6. The radio frequency identification system according to claim 1, wherein the stored information is sound.

* * * * *